United States Patent [19]

Pham et al.

[11] Patent Number: 4,853,420

[45] Date of Patent: Aug. 1, 1989

[54] FOAMABLE THERMOPLASTIC POLYMERS AND A METHOD FOR FOAMING

[75] Inventors: Tu-Anh Pham, Lake Jackson; Gerald M. Lancaster, Freeport, both of Tex.

[73] Assignee: The Dow Chemical Company, Midland, Mich.

[21] Appl. No.: 47,071

[22] Filed: May 4, 1987

[51] Int. Cl.$^4$ ............................................. C08J 9/00
[52] U.S. Cl. ........................... 521/50.5; 521/53; 521/55; 521/74; 264/41; 264/45.1; 264/45.2; 264/45.4; 264/46.5; 264/50; 264/51
[58] Field of Search ............... 264/22, 41, 45.1, 45.2, 264/45.4, 46.5, 50, 51; 521/50.5, 53, 55, 74

[56] References Cited

U.S. PATENT DOCUMENTS

| | | | |
|---|---|---|---|
| 3,504,068 | 3/1970 | Zizlsperger et al. | 264/41 |
| 3,616,365 | 10/1971 | Stastny et al. | 204/159.14 |
| 4,268,238 | 5/1981 | Marc | 425/174.8 E |
| 4,370,423 | 1/1983 | Rys-Sikora | 521/84 |
| 4,391,922 | 7/1983 | Harrell | 521/88 |
| 4,394,459 | 7/1983 | Rys-Sikora | 521/84 |
| 4,524,037 | 6/1985 | Marc | 264/26 |
| 4,600,614 | 7/1986 | Lancaster et al. | 428/35 |
| 4,601,948 | 7/1986 | Lancaster et al. | 428/349 |
| 4,640,865 | 2/1987 | Lancaster et al. | 428/421 |
| 4,664,971 | 5/1987 | Soens | 428/288 |
| 4,675,143 | 6/1987 | Wakita et al. | 264/104 |
| 4,716,062 | 12/1987 | Klein | 428/36 |

*Primary Examiner*—Maurice J. Welsh
*Assistant Examiner*—Samuel A. Acquah

[57] ABSTRACT

Foamed products are prepared by subjecting a crosslinked polymer such as an ethylene-carbon monoxide copolymer susceptible to heating by high frequency electromagnetic radiation such as microwave or radio frequency which has been imbibed or impregnated with a suitable mechanical or physical blowing agent such as a halogenated hydrocarbon to sufficient high frequency electromagnetic radiation to cause foaming of the polymer.

4 Claims, No Drawings

FOAMABLE THERMOPLASTIC POLYMERS AND A METHOD FOR FOAMING

FIELD OF THE INVENTION

The present invention concerns a method for foaming polymers or polymeric mixtures and to foamable polymers.

BACKGROUND OF THE INVENTION

Thermoplastic polymers have heretofore been foamed by imbibing or impregnating the polymer with a suitable blowing agent and subsequently heating the imbibed polymer by conventional means such as steam or forced air ovens and the like. Thermoplastic polymers which have been blended with a polarizing agent and which have been impregnated or imbibed with a suitable blowing agent have been foamed by subjecting the resultant treated polymers to microwave energy.

It would be desirable to be able to foam thermoplastic polymers which have been impregnated or imbibed with a suitable blowing agent to electromagnetic radiation without also having to blend into the polymer a polarizing agent.

SUMMARY OF THE INVENTION

The present invention pertains to a polymer composition which when subjected to high frequency electromagnetic radiation produces a foamed polymer, which composition comprises a polymer composition comprising (1) from about 10 to about 100, suitably from about 15 to about 100, more suitably from about 30 to about 100, most suitably from about 35 to about 100 percent by weight of at least one thermoplastic polymer which is heatable when subjected to high frequency electromagnetic radiation, which polymer contains in its backbone, some carbon atoms which have attached thereto a member selected from the group consisting of $=O$, $-Cl$, $-OH$, $-OCH_3$, $-OC_2H_5$, $-O-CO-CH_3$, and $-O-CO-C_2H_5$: which groups are present in an amount to render the polymer heatable by high frequency electromagnetic radiation; and (2) from about zero to about 90, suitably from about zero to about 85, more suitably from about zero to about 70, most suitably from about zero to about 65 percent by weight of at least one polymer which is not heatable when subjected to high frequency electromagnetic radiation; and wherein said polymer composition has been imbibed or impregnated with a suitable mechanical or physical blowing agent in an amount which causes expansion of the imbibed or impregnated polymer when subjected to a sufficient amount of electromagnetic radiation to cause foaming of the imbibed or impregnated polymer composition.

Another aspect of the present invention pertains to a method for foaming polymers which method comprises (A) imbibing or impregnating a polymer composition comprising (1) from about 10 to about 100, suitably from about 15 to about 100, more suitably from about 30 to about 100, most suitably from about 35 to about 100 percent by weight of at least one thermoplastic polymer which is heatable when subjected to high frequency electromagnetic radiation; and (2) from about zero to about 90, suitably from about zero to about 85, more suitably from about zero to about 70, most suitably from about zero to about 65 percent by weight of at least one thermoplastic polymer which is not heatable when subjected to high frequency electromagnetic radiation with a sufficient quantity of a mechanical or physical blowing agent to cause expansion of the polymer when subjected to the treatment of step (B); and (B) subjecting the resultant imbibed or impregnated polymer composition to a sufficient amount of high frequency electromagnetic radiation to cause foaming.

Another aspect of the present invention pertains to the foamed products resulting from the aforementioned foaming method.

The polymer compositions containing ethylene and carbon monoxide having incorporated therein a mechanical or physical blowing agent can be foamed with high frequency electromagnetic radiation without the polymer composition also containing a polarizing compound. The resultant foamed products have fine, substantially uniform cells.

DETAILED DESCRIPTION OF THE INVENTION

The term high frequency electromagnetic radiation as employed herein means that the electromagnetic energy has a frequency of from about 0.1 to about 30,000 MHz and includes the ultrasonic frequency range of from about 18 KHz to about 1000 KHz, the radio frequency (RF) range of from about >1 MHz to about 300 MHz, and the microwave (MW) frequency range of from about >300 MHz to about 30,000 MHz. The electromagnetic radiation is suitably employed in the range of from about 20 to 30,000, more suitably from about 20 to about 10,000, even more suitably from about 25 to about 5,000, most suitably in the range of from about 30 to about 3,000 MHz. The electromagnetic radiation employed in the process of the present invention has power suitably in the range of from about 0.5 to about 1,000, more suitably from about 0.5 to about 200, most suitably from about 0.5, to about 150 Kw.

Polymers which are susceptible to heating when subjected to high frequency electromagnetic radiation include those polymers which have backbone carbon atoms which contain one or more of the groups selected from $=O$, $-Cl$, $-OH$, $-OCH_3$, $-OC_2H_5$, $-O-CO-CH_3$, and $-O-CO-C_2H_5$; which groups are present in the following amounts:

(a) when backbone carbon atoms contain the $=O$ group, the group is present in an amount of from about 0.5 to about 26, suitably from about 0.7 to about 23, more suitably from about 1 to about 20, percent by weight based upon the total weight of the polymer;

(b) when backbone carbon atoms contain the $-Cl$ group, the group is present in an amount of from about 1 to about 57, suitably from about 5 to about 50, more suitably from about 10 to about 45, percent by weight based upon the total weight of the polymer;

(c) when backbone carbon atoms contain the $-OH$ group, the group is present in an amount of from about 1 to about 38, suitably from about 5 to about 35, more suitably from about 10 to about 30, percent by weight based upon the total weight of the polymer;

(d) when backbone carbon atoms contain the $-OCH_3$ group, the group is present in an amount of from about 1 to about 50, suitably from about 5 to about 45, more suitably from about 10 to about 40, percent by weight based upon the total weight of the polymer;

(e) when backbone carbon atoms contain the —OC$_2$H$_5$ group, the group is present in an amount of from about 1.5 to about 75, suitably from about 5 to about 70, more suitably from about 10 to about 65, percent by weight based upon the total weight of the polymer;

(f) when backbone carbon atoms contain the —O—CO—CH$_3$ group, the group is present in an amount of from about 5 to about 55, suitably from about 10 to about 50, more suitably from about 15 to about 50, percent by weight based upon the total weight of the polymer;

(g) when backbone carbon atoms contain the —O—CO—C$_2$H$_5$ group, the group is present in an amount of from about 5 to about 62, suitably from about 10 to about 60, more suitably from about 15 to about 60, percent by weight based upon the total weight of the polymer.

Polymers which are suitable for use in the present invention include, for example, those copolymers, terpolymers and interpolymers of carbon monoxide and one or more α-olefins, and if desired, other α,β-ethylenicaly unsaturated monomers such as, for example, polymerizable α,β-ethylenically unsaturated mono-carboxylic acids, polymerizable esters of α,β-ethylenicaly unsaturated monocarboxylic acids, polymerizable vinyl aromatic monomers, polymerizable halogenated vinyl aromatic monomers, polymerizable vinyl esters of monocarboxylic acids, combinations thereof and the like. These and other polymers and copolymers and methods for their preparation are more fully described in U.S. Pat. Nos. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; 4,304,887; and 4,600,614; all of which are incorporated herein by reference.

Particularly suitable polymers include those containing polymerized units of carbon monoxide and ethylene or carbon monoxide and any combination of ethylene and one or more C$_3$ to C$_{12}$, preferably C$_3$ to C$_8$ monoolefins. Also polymers of carbon monoxide, one or more α-olefins and one or more unsaturated organic acids having from 3 to about 12, preferably from about 3 to about 8 carbon atoms, such as, for example, acrylic acid, methacrylic acid, 1-butenoic acid, and the like: as well as one or more C$_1$ to C$_{12}$, preferably C$_1$ to C$_8$, alkyl esters or alkali or alkaline earth metal salts of these acids, such as, for example, ethyl acrylate, methyl methacrylate, 2-ethylhexyl acrylate, n-butyl acrylate, n-butyl methacrylate, sodium acrylate, potassium acrylate, magnesium acrylate, calcium acrylate, sodium methacrylate, potassium methacrylate, magnesium methacrylate, calcium methacrylate, combinations thereof and the like can be employed. Also, the hydrogenated carbon monoxide containing olefin polymers (which creates C—OH groups along the polymer chain), such as, for example, hydrogenated ethylene-carbon monoxide copolymers can be employed. U.S. Pat. No. 2,495,292, which is incorporated herein by reference, discloses methods for hydrogenating such CO groups in a polymer chain.

These polymers can be prepared by any of the well known means such as by polymerizing a mixture of the monomers in the presence of a suitable catalyst such as the well known Ziegler-Type, Ziegler-Natta Type or Phillips-Type. Those catalysts which are not easily poisoned or deactivated by the carbon monoxide which is generally highly reactive with many metal-carbon bonds is preferred. Particularly suitable catalysts include those disclosed in U.S. Pat. No. 3,083,184. The polymers can be prepared in the presence of these catalysts by the well known high pressure, high temperature, free-radical initiated, polymerization method such as the historically-popular ICI process or such as disclosed in U.S. Pat. No. 2,497,323.

Other suitable polymers which are heatable by high frequency electromagnetic radiation include, for example, polyvinyl chloride, polyvinylidene chloride, ethylene/vinyl alcohol copolymers, ethylene/vinyl acetate copolymers.

Particularly suitable polymers which are heatable by high frequency electromagnetic radiation include, for example, carbon monoxide-containing interpolymers such as, for example, ethylene/carbon monoxide copolymers, ethylene/acrylic acid/carbon monoxide terpolymers, ethylene/n-butyl acrylate/carbon monoxide terpolymers, ethylene/vinyl acetate/carbon monoxide terpolymers: wherein the carbon monoxide content of the interpolymers is in the range of from about 1 to about 45, suitably from about 3 to about 40, most suitably from about 5 to about 35 percent by weight based upon the total weight of the interpolymer.

Suitable thermoplastic polymers which are not susceptible to heating upon exposure to high frequency electromagnetic radiation include any of the aforementioned polymers which do not contain carbon monoxide. Particularly suitable polymers include, for example, polyethylene, polymers of ethylene and at least one other monomer such as, for example, α,β-ethylenically unsaturated compounds such as, for example α,β-ethylenically unsaturated acids, esters of α,β-ethylenically unsaturated acids, metal salts of α,β-ethylenically unsaturated acids and higher α-olefins. Particularly suitable monomers for polymerizing with ethylene include, for example, acrylic acid, methacrylic acid, ethyl acrylate, methyl methacrylate, sodium acrylate, potassium acrylate, calcium acrylate, magnesium acrylate, sodium methacrylate, potassium methacrylate, propylene, butene-1, hexene-1, octene-1, combinations thereof and the like.

The polymers of the present invention which are heatable by electromagnetic radiation can, if desired, be crosslinked by any of the well known methods, such as by subjecting the polymers to ionizing radiation such as, for example, electron beam radiation, gamma radiation and the like. Another method is to crosslink the polymer by reacting it with an organic peroxide. Suitable organic peroxides include, for example, dicumyl peroxide, bis(t-butylperoxy)diisopropylbenzene, diacyl peroxides such as benzoyl peroxide, hydroperoxides such as t-butyl hydroperoxide, peroxyesters such as t-butyl peroxy pivalate, combinations thereof and the like.

Crosslinking of the polymer results in the foam having a more uniform cellular structure than the foams prepared from the polymers which have not been crosslinked. The polymers, for the purposes of the present invention, should not be crosslinked to such a degree that it prevents expansion of the polymer when subjected to electromagnetic radiation. The extent of crosslinking necessary and thus the amount of peroxide or the radiation dosage utilized can vary depending on the polymer or polymers. One method of determining whether the polymer composition is sufficiently crosslinked or cured is by measuring its viscoelasticity or extensibility at the temperature of foaming. This can be carried-out in an environmental chamber with proper temperature control capabilities. Typically, a sufficiently cured or crosslinked polymer composition is one which resists breakage when stretched at elevated temperature (foaming temperature) and which also resists collapse upon cooling. Further, it is very easy to perform routine, simple experiments to determine the degree of crosslinking for the particular polymer for which foaming by the process of the present invention is desired.

Though many polymers require little or no crosslinking, it is desirable to have some degree of crosslinking in most polymers. For certain polymers, however, insufficient crosslinking may cause severe dimensional instability, resulting in collapse of the foam immediately after expansion. On the other hand, over-crosslinking or too much crosslinking can cause the polymer to have poor melt extendibility, resulting in severe rupture of the cell walls during foam expansion.

Some polymers which are heatable by electromagnetic radiation do not necessarily need to be crosslinked in order to make foams with acceptable properties. Examples of such polymers are those ethylene/carbon monoxide interpolymers which also contain acrylic acid.

By the term "mechanical or physical foaming or blowing agent" it is meant that the blowing agent is a substance which is normally a gas which expands upon heating or a substance which is normally a liquid which when heated converts to a gas which then expands on further heating. These foaming or blowing agents should be non-solvents for the polymer or at the least, they should be poor solvents for the polymer. Suitable mechanical or physical foaming or blowing agents which can be employed herein include any gas or liquid which is substantially inert to the polymers which are to be foamed. Such mechanical or physical foaming or blowing agents include, for example, hydrocarbons and halocarbons such as, but not limited to, n-butane, isobutane, neopentane, dichlorodifluoromethane, bromotrifluoromethane, carbon tetrafluoride, trichlorofluoromethane, dichlorofluoromethane, dichlorotetrafluoroethane, trichlorotrifluoroethane, dichlorotetrafluoroethane, chloropentafluoroethane, chorodifluoroethane, difluoroethane, combinations thereof and the like.

The foaming or blowing agent is employed in any suitable quantity which provides the resultant foamed polymer with the desired degree of expansion or density. The foaming or blowing agent is suitably imbibed or impregnated into the polymer in an amount of from about 2 to about 35, more suitably from about 5 to about 30, most suitably from about 5 to about 25, percent by weight based upon total weight of the polymer plus foaming or blowing agent. Too little blowing agent results in very high density foams while too much blowing agent causes the cell walls of the resultant foamed polymer to rupture. Different polymers will require different amounts of blowing agent to achieve the desired amount of foaming. The amount of foaming or blowing agent required for the polymer to be foamed can be accomplished by simple experimentation on small quantities of polymer. Also, the resultant density of the foam will not only depend upon the amount of blowing agent present, but on the pressure employed during expansion. Pressure can be applied by employing a mold with one open side with a movable cover which just fits inside the mold and which moves with the expanding polymer. The pressure can be adjusted by adding weight to the movable cover. Another method is to employ a closed mold which is then filled or partially filled with foamable polymer particles which then foam against the sides of the mold creating its own internal pressure.

The carbon monoxide-containing polymers can be inbibed or impregnated with the mechanical or physical foaming or blowing agent by any of the well known means such as those described in U.S. Pat. Nos. 3,504,068; 3,886,100, 3,959,189 and 4,379,859, which are incorporated herein by reference. A particularly suitable method is to immerse the carbonyl-containing polymer in a container containing the foaming or blowing agent or agents to be employed and subjecting the immersed polymer to an elevated temperature under pressure. Suitable temperatures which can be employed to imbibe or impregnate the polymer are those from about 40° C. to about 135° C., more suitably from about 40° C. to about 130° C., most suitably from about 50° C. to about 135° C. Generally, the total amount of foaming or blowing agent impregnated in a polymer increases with temperature. However, the temperature should be chosen so that the polymer will only soften and not melt completely. When the temperature is too low, not enough foaming or blowing agent is imbibed or impregnated into the polymer. When the temperature is too high, the polymer will melt.

The foaming or blowing agent can be imbibed or impregnated into the polymer under any pressure which is sufficient to impart the desired amount of blowing agent or foaming agent into the polymer for the particular time and temperature employed. Particularly suitable pressures which can be employed to imbibe or impregnate the polymer are those from about 100 psig to about 1000 psig, more suitably from about 100 psig to about 700 psig, most suitably from about 100 psig to about 500 psig. To achieve the desired pressure, a padding of an inert gas such as, for example, nitrogen can be employed. Pressures which are too low can result in insufficient uptake of the blowing agent and can cause the expanded product to have a higher density. Pressures which are too high can cause the polymer particles or pellets to clump or even partially fuse together. However, if the polymer is in the form of sheets, higher pressures should not have any adverse affect upon the polymer.

The polymers can be in the form of discrete particles, rods, bars, sheets or any shape when imbibed or impregnated with the mechanical or physical foaming or blowing agents employed herein. One particular desirable form is that of discrete particles so as to form expandable "beads" such that they can be used to fill or partially fill as desired, a mold cavity of the desired configuration and when subjected to electromagnetic radiation expand to produce a foam of desired density and configuration. The density of the resultant foam depends upon the total amount of foaming or blowing agent present, the vapor pressure of the blowing agent, the thermal volume expansion ratio of the blowing agent, and the density of the polymer to be foamed.

The foamed products produced by the method described herein have densities suitably in the range of from about 0.6 to about 10, more suitably from about 1.5 to about 5, pounds per cubic foot. The foams produced by the method described herein have average cell sizes suitably in the range of from about 100 to bout 3000, more suitably from about 150 to about 1500, microns.

If desired, the polymer compositions of the present invention can contain other additives such as antioxidants, pigments, dyes, stabilizers, combinations thereof and the like. Particularly suitable antioxidants include, for example, tetrakis[methylene-3(3',5'-di-t-butyl-4'-hydroxypheny)propionate]methane which is commercially available from Ciba-Geigy Corporation under the tradename IRGANOX 1010.

The following examples are illustrative of the invention, but are not to be construed as to limiting the scope thereof in any manner.

Unless otherwise stated, the melt flow index of the polymers employed in the examples and comparative experiments is obtained according to ASTM D-1238, Condition E. The term "hand" as employed herein means the manner in which the foam's surface feels to the touch e.g. "soft", "silky", "rough" and the like.

EXAMPLE 1

Pellets of an ethylene/carbon monoxide copolymer (ECO) containing 10 wt. % CO and having a melt flow index of 10 g/10 min. are electron beam irradiated at 3, 4 and 5 megarads (Mrads). After irradiation, they are impregnated with a foaming or blowing agent, dichlorotetrafluoroethane (DCTFE), by immersion in liquid (dry ice temperature) DCTFE. A sufficient quantity of DCTFE is employed so as to completely submerge all of the thus crosslinked ethylene/CO copolymer pellets. The autoclave is then subjected to a temperature of 85° C. and a pressure of 230-240 psig (1.5847-1.6536 MPa) for 16-18 hours. The autoclave and its contents are thoroughly chilled in a dry ice bath before removing the thus imbibed or impregnated pellets. The total DCTFE uptake is 18 weight percent in the pellets.

The thus treated pellets are then placed in a plastic (polystyrene) test tube and placed in a microwave field utilizing a Gerling Moore microwave generator (2450 MHz, 2.6 Kw). The pellets expanded and gave white ethylene/CO foam beads with fine cells. The time the pellets are subjected to the microwave source and results are given in table I. This example shows that the ECO pellets generated sufficient heat when exposed to a microwave field to cause foaming to occur, and that the foamed products, having been cured properly, are dimensionally stable and exhibit excellent properties.

COMPARATIVE EXPERIMENT A

In like manner as in Example 1, low density homopolymer of ethylene (LDPE) having a melt flow index of 5 g/10 min. is crosslinked by electron beam irradiation and imbibed with DCTFE. Also, in like manner as in Example 1, the imbibed or impregnated pellets are subjected to foaming via a microwave field. The results are given in Table I. This experiment demonstrates that the low density homopolymer of ethylene did not heat sufficiently in the microwave field to cause foaming of the imbibed polymer.

COMPARATIVE EXPERIMENT B

In like manner as in Example 1, an ethylene/acrylic acid copolymer (EAA) containing 9.5 wt. % acrylic acid and having a melt flow index of 1.5 g/10 min. is crosslinked by electron beam irradiation and imbibed with DCTFE. Also, in like manner as in Example 1, the imbibed or impregnated pellets are subjected to foaming via a microwave field. The results are given in Table I. This experiment demonstrates that the ethylene/acrylic acid copolymer did not heat sufficiently in the microwave field to cause foaming of the imbibed polymer.

COMPARATIVE EXPERIMENT C

In like manner as in Example 1, an ethylene/carbon monoxide copolymer (ECO) containing 10 wt. % carbon monoxide and having a melt flow index of 10 g/10 min. is imbibed with DCTFE. However, the ethylene/carbon monoxide copolymer was not crosslinked prior to imbibing or impregnating with the foaming or blowing agent. Also, in like manner as in Example 1, the imbibed or impregnated pellets are subjected to foaming via a microwave field. The results are given in Table I. This experiment demonstrates that when the polymer has not been crosslinked sufficiently, the resultant foam collapses.

TABLE I

|  | Example 1-A | Example 1-B | Example 1-C | Comp Expt. A* | Comp. Expt. B* | Comp. Expt. C* |
|---|---|---|---|---|---|---|
| Copolymer | ECO 10% CO 10MI | ECO 10% CO 10MI | ECO 10% CO 10MI | LDPE 5MI | EAA (9.5% AA, 1.5MI) | ECO 10% CO 10MI |
| Crosslinking, Type/dosage | electron beam/ 3 Mrads | electron beam/ 4 Mrads | electron beam/ 5 Mrads | electron beam/ 4 Mrads | electron beam/ 4 Mrads | None |
| Foaming Agent Type | DCTFE | DCTFE | DCTFE | DCTFE | DCTFE | DCTFE |
| Content$^c$, wt % | 18 | 18 | 18 | 18 | 18 | 18 |
| Expansion Heating Method | Microwave, 2450 MHz, 2.6 Kw | Microwave, 2450 MHz, 2.6 Kw | Microwave, 2450 MHz, 2.6 Kw | Microwave, 2450 MHz, 2.6 Kw | Microwave, 2450 MHz, 2.6 Kw | Microwave, 2450 MHz, 2.6 Kw |
| Total Foam Time, sec | 18-20 | 18-20 | 18-20 | 50-60 | 50-60 | 20 |
| Foam density, pcf ,kg/m$^3$ | 2-2.5 32-40 | 2-2.5 32-40 | 2-2.5 32-40 | No foaming occurred | No foaming occurred | Foam collapsed |
| Expansion Ratio$^e$ | 25-28 | 25-28 | 25-28 | — | — | — |
| Avg. Cell Size, μ | 200-300 | 200-300 | 200-300 | — | — | — |
| Foam Characteristics | Good hand & resiliency | Good hand & resiliency | Good hand & resiliency | — | — | — |

*Not an example of the present invention.

EXAMPLE 2

Ethylene/carbon monoxide copolymer pellets containing 10 wt. % carbon monoxide and having a melt flow index of 10 g/10 min. are treated as in Example 1 with DCTFE. The thus imbibed or impregnated pellets are then subjected to a model EO-1 Thermall Radio Frequency (RF) oven having a 500 watt power output and 67-80 MHz frequency, manufactured by W. T. LaRose and Associates. A plate separation of about 7/16 inch (11.11 mm) to ½ inch (12.7 mm) is utilized. The results are given in Table II. This example demonstrates that the ECO pellets imbibed with blowing agent and exposed to a radio frequency field generates sufficient heat to cause foaming to occur.

COMPARATIVE EXPERIMENT D

In like manner as in Example 1, a low density homopolymer of ethylene (LDPE) having a melt flow index of 5 g/10 min. is crosslinked by electron beam irradiation and imbibed with DCTFE. In like manner as in Example 2, the imbibed or impregnated pellets are subjected to foaming in the aforementioned Radio Frequency oven. The results are given in Table II. This experiment demonstrates that LDPE imbibed with foaming agent and exposed to a radio frequency field does not generate sufficient heat to cause foaming to occur.

COMPARATIVE EXPERIMENT E

In like manner as in Example 1, an ethylene/acrylic acid copolymer (EAA) containing 9.5 wt. % acrylic acid and having a melt flow index of 1.5 g/10 min. is crosslinked by electron beam irradiation and imbibed with DCTFE. In like manner as in Example 2, the imbibed or impregnated pellets are subjected to foaming in a Radio Frequency oven. The results are given in Table II. This experiment demonstrates that a crosslinked EAA copolymer imbibed with foaming agent and exposed to a radio frequency field does not generate sufficient heat to cause foaming to occur.

COMPARATIVE EXPERIMENT F

In like manner as in Example 1, an ethylene/carbon monoxide copolymer (ECO) containing 10 wt. % carbon monoxide and having a melt flow index of 10 g/10 min. is imbibed, without crosslinking with DCTFE. However, the ethylene/carbon monoxide copolymer pellets are not crosslinked prior to being imbibed or impregnated with the blowing agent. In like manner as in Example 2, the imbibed or impregnated pellets are subjected to foaming in the aforementioned Radio Frequency oven. The results are given in Table II. This experiment demonstrates that an uncrosslinked ECO copolymer imbibed with foaming agent and exposed to a radio frequency field foams and then collapses.

COMPARATIVE EXPERIMENT G

Ethylene/carbon monoxide copolymer (ECO) pellets containing 10 wt. % carbon monoxide and having a melt flow index of 10 g/10 min. are irradiated in an electron beam at 3, 4 and 5 Mrads are treated as in Example 1 with DCTFE. The thus imbibed or impregnated pellets then subjected to heating in a conventional forced air oven set at 130° C. to 135° C. Foaming begins after 70-80 seconds and the final products (after 90-100 seconds) exhibit non-uniform and very coarse cell size (1-2 mm), poor resiliency, rough skin, decreased softness and a much lower expansion ratio. The results are given in Table II. This experiment demonstrates that conventional heating techniques are inadequate in heating a thick or bulky particle or object.

TABLE II

|  | Example 2-A | Example 2-B | Example 2-C | Comp. Expt. D* | Comp. Expt. E* | Comp. Expt. F* |
| --- | --- | --- | --- | --- | --- | --- |
| Copolymer | ECO 10% CO 10MI | ECO 10% CO 10MI | ECO 10% CO 10MI | LDPE 5MI | EAA (9.5% AA, 1.5MI) | ECO 10%, 10MI |
| Crosslinking, Type/dosage | electron beam/ 3Mrads | electron beam/ 4Mrads | electron beam/ 5Mrads | electron beam/ 4Mrads | electron beam/ 4Mrads | None |
| Foaming Agent |  |  |  |  |  |  |
| Type | DCTFE | DCTFE | DCTFE | DCTFE | DCTFE | DCTFE |
| Content$^c$, wt % | 18 | 18 | 18 | 18 | 18 | 18 |
| Expansion Heating Method | Radio Freq. 67-80 MHz, 0.5 Kw | Radio Freq. 67-80 MHz, 0.5 Kw | Radio Freq., 67-80 MHz, 0.5 Kw | Radio Freq., 67-80 MHz, 0.5 Kw | Radio Freq., 67-80 MHz, 0.5 Kw | Radio Freq., 67-80 MHz, 0.5 Kw |
| Total Foam Time, sec | 18 | 18 | 18 | 50-60 | 50-60 | 20 |
| Foam density, pcf ,kg/m$^3$ | 2-2.5 32-40 | 2-2.5 32-40 | 2-2.5 32-40 | No foaming occurs | No foaming occurs | Foam collapses |
| Expansion Ratio | 25-28 | 25-28 | 25-28 | — | — | — |
| Avg. Cell Size, μ | 200-300 | 200-300 | 200-300 | — | — | — |
| Foam Characteristics | White, good hand & resiliency | White, good hand & resiliency | White, good hand & resiliency | — | — | — |

|  | Comp. Expt. G* | Comp. Expt. G* | Comp. Expt. G* |
| --- | --- | --- | --- |
| Copolymer | ECO 10%, 10MI | ECO 10%, 10MI | ECO 10%, 10MI |
| Crosslinking, Type/dosage | electron beam/ 3 Mrads | electron beam/ 4 Mrads | electron beam/ 5 Mrads |
| Foaming Agent |  |  |  |
| Type | DCTFE | DCTFE | DCTFE |
| Content$^c$, wt % | 18 | 18 | 18 |
| Expansion Heating Method | Conv.Forced Air Oven 130-135° C. | Conv.Forced Air Oven 130-135° C. | Conv.Forced Air Oven 130-135° C. |
| Total Foam Time, sec | 80-100 | 80-100 | 80-100 |
| Foam density, pcf ,kg/m$^3$ | — | — | — |
| Expansion Ratio$^e$ | — | — | — |
| Avg. Cell Size | 1-2 mm | 1-2 mm | 1-2 mm |
| Foam | Non-uniform, | Non-uniform, | Non-uniform, |

TABLE II-continued

| Characteristics | very coarse, poor resiliency, rough skin, decreased softness, lower expansion ratio | very coarse, poor resiliency, rough skin, decreased softness, lower expansion ratio | very coarse, poor resiliency, rough skin, decreased softness, lower expansion ratio |
| --- | --- | --- | --- |

*Not an example of the present invention.

EXAMPLE 3

Pellets of ethylene/carbon monoxide copolymer containing 10 wt. % carbon monoxide and having a melt flow index of 10 g/10 min. are electron beam irradiated as described in Example 1 at 1, 2, 3, 4, 5, 6, 10, and 15 megarads (Mrads). The resulting crosslinked pellets are imbibed or impregnated with foaming or blowing agent (DCTFE) and are subjected to a microwave field for foaming as described in Example 1. The results are given in Table III. This example demonstrates that for ethylene/carbon monoxide copolymer containing 10 wt. % carbon monoxide, some amount of crosslinking is necessary to produce a dimensionally stable foam bead, and that the more crosslinked is the polymer (higher radiation dosages), the finer is the cell size and the softer and more silky "hand" is the foam product. Overcrosslinking is seen to occur at 6 Mrads and above, which results in markedly decreased melt elasticity and extendibility of the polymer during foaming which causes the formation of large voids and cracks in the resultant foam products.

TABLE III

| DOSE | OBSERVATIONS |
| --- | --- |
| 1 Mrad* | Very large, non-uniform cell size, partial foam collapse |
| 2 Mrads* | non-uniform cell size, 1-2mm |
| 3 Mrads | uniform and fine cell size, 350-500 $\mu$, few small voids |
| 4 Mrads | uniform and fine cells, 250-350 $\mu$, silky "hand", |
| 5 Mrads | uniform and fine cells, 200-300 $\mu$, few small voids |
| 6 Mrads* | full expansion, smooth skin, fine cells, but large internal voids |
| 10 Mrads* | full expansion, very fine cells, but very large voids |
| 15 Mrads* | very large voids, signs of surface cracking |

*Not an example of the present invention. It should be understood that other polymers can be suitably foamed at dosages which are not suitable for this particular polymer.

EXAMPLE 4

In like manner as in Example 1, pellets of an ethylene/carbon monoxide copolymer (ECO) containing 10 wt. % carbon monoxide and having a melt flow index of 1.5 g/10 min. are electron beam irradiated at 1, 2 and 3 megarads. Also in like manner as in Example 1, the thus irradiated pellets are imbibed or impregnated with DCTFE foaming or blowing agent. The thus imbibed or impregnated pellets are foamed by the techniques described in Examples 1 and 2, resulting in expanded beads of 4 to 6 pcf (64.04–96.06 kg/m$^3$) density and 100–200$\mu$ cell size. This example shows that the higher the molecular weight of the polymer (lower melt flow index), the lower the irradiation doses required to obtain the necessary polymer melt extendibility during foaming to achieve fine cells in the foam products.

EXAMPLE 5

Pellets of an ethylene/carbon monoxide copolymer containing 10 wt. % carbon monoxide and having a melt flow index of 10 g/10 min. are irradiated at 5 Mrads and are imbibed or impregnated with blowing agent (DCTFE) as described in Example 1 except that a portion of the pellets are imbibed or impregnated at 85° C. for 7 hours and another portion of the pellets are imbibed or impregnated at 95° C. for 7 hours. Both imbibings or impregnations are done at 230–240 psig (1.58–1.65 MPa). The pellets which are imbibed or impregnated at 85° C. contain 19–20 wt. % foaming or blowing agent while the pellets which are imbibed or impregnated at 95° C. contain 23–24 wt. % foaming or blowing agent.

This example shows that increasing the temperature during impregnation or imbibing the polymer with foaming or blowing agent increases the amount of foaming or blowing agent adsorbed into the polymer within the same time period of imbibing or impregnating with the foaming or blowing agent.

EXAMPLE 6

Pellets of an ethylene/carbon monoxide copolymer containing 10 wt. % carbon monoxide and having a melt flow index of 10 g/10 min. are compounded with 0.3 phr (part per hundred parts of copolymer) of dicumyl peroxide at 125° C. in a Haake mixer over a period of 8–10 minutes. The resultant mixture is compression molded into 10 mil (0.254 mm) thick films and subsequently cured (crosslinked) at 180° C. for 10 min. The cured (crosslinked) film samples are imbibed with foaming or blowing agent (DCTFE) as described in Example 1. The resultant imbibed or impregnated sheets are foamed in a microwave field as described in Example 1 which results in a white, soft, flexible, resilient, and fine cell foam sheet of 3–5 pcf (4880 kg/m$^3$) density. The product obtained when this same composition is foamed in a conventional forced air oven (135° C. results in a foam having larger cells and decreased softness and flexibility.

EXAMPLE 7

Pellets of an ethylene/carbon monoxide copolymer containing 10 wt. % carbon monoxide and having a melt flow index of 10 g/10 min. are irradiated at 5 megarads (Mrads) and imbibed with DCTFE as described in Example 1.

PART A

A portion of the thus imbibed pellets are expanded individually in a LaRose Radio Frequency (RF) oven (60–80 MHz frequency and 10 Kw power output). The resultant expanded beads are placed in a rectangular polytetrafluoroethylene, closed mold and are subsequently heated in the aforementioned LaRose Radio Frequency oven for 60 sec. to produce a molded foam block having a density of 2.5–3 pcf (40–48 kg/m³).

PART B

Another portion of the thus imbibed (unexpanded) pellets are placed in the same rectangular polytetrafluoroethylene, closed mold, which in turn is placed in the RF oven and heated for 60–80 sec. The resultant product is a rectangular molded foam block having fine cells, soft, silky "hand" and a core density of 2.5–3 pcf (40–48 kg/m³).

This example shows that a molded foam article can be obtained by dielectrically foaming the individual imbibed pellets first, then dielectrically molding the expanded beads into the desired shape. Alternatively, the imbibed or impregnated unexpanded pellets or beads can be expanded and molded into the desired article in one step.

EXAMPLE 8

One part by weight of an ethylene-carbon monoxide (ECO) copolymer containing 19% by weight carbon monoxide and having a melt index of 8 g/10 min. was blended with one part by weight of a low density polyethylene homopolymer having a melt index of 5 g/10 min. utilizing a 1 inch (25.4 mm) single screw extruder. Subsequently, 0.5 part by weight of dicumyl peroxide was added to 100 pars by weight of the polymer blend at 125° C. over a period of 8–10 minutes using a Haake mixer. The resultant mixture was compression molded into a 60-mil thick plaque, which was imbibed with dichlorotetrafluoroethane (Freon®114) and finally subjected to foaming by microwave energy as described in Example 1. The sample expanded and gave a white, resilient foam product having a density of approximately 2.5 lbs/ft³(0.04 g/cm³) after 18–20 seconds.

This example demonstrated that a mixture of a polymer which is heatable by high frequency electromagnetic radiation (an ethylene-carbon monoxide copolymer) and a polymer which is not heatable by electromagnetic radiation (a low density polyethylene homopolymer) will foam when subjected to high frequency electromagnetic radiation.

We claim:

1. A method for forming a shaped object from a thermoplastic polymer foam which method comprises
   (a) foaming or expanding by high frequency electromagnetic radiation or by conventional means individual thermoplastic beads or pellets which have been imbibed with a mechanical or physical foaming or blowing agent: and
   (b) placing the expanded beads or pellets in a suitable mold having the desired shape and subjecting the thus filled mold to high frequency electromagnetic radiation thereby causing the beads or pellets to fuse together thereby forming a foamed object of the desired shape.

2. The method of claim 1 wherein a combination of conventional heat sources and high frequency electromagnetic radiation is utilized.

3. The method of claim 2 wherein the foaming or expanding of the individual beads and the molding of such expanded beads are performed simultaneously utilizing high frequency electromagnetic radiation to achieve a foamed article of desired shape.

4. The foamed product produced by the method of claims 1, 2, or 3.

* * * * *